United States Patent [19]

Maria

[11] Patent Number: 5,416,525
[45] Date of Patent: May 16, 1995

[54] METHOD AND APPARATUS FOR DIGITALLY CODING AND DECODING A COMPOSITE SIGNAL, CONTAINING BASEBAND AND OUT-OF-BAND SIGNALS USING RELATIVELY FEW BITS AND YIELDING A DECODED OUT-OF-BAND SIGNAL HAVING INCREASED QUALITY

[75] Inventor: Antonius J. R. Maria, Oudenbosch, Netherlands

[73] Assignee: Koninklijke PTT Nederland N.V., Netherlands

[21] Appl. No.: 100,106

[22] Filed: Jul. 30, 1993

[30] Foreign Application Priority Data

Aug. 11, 1992 [NL] Netherlands ..................... 9201439

[51] Int. Cl.6 ........................... H04N 7/24; H04N 7/52
[52] U.S. Cl. ..................... 348/472; 348/484; 348/572
[58] Field of Search ............... 375/25, 26, 28; 358/86, 358/143; 348/484, 488, 485, 486, 471, 472, 572; H04N 7/13

[56] References Cited

U.S. PATENT DOCUMENTS

| 4,054,794 | 10/1977 | Loughlin et al. | 348/484 |
| 4,275,411 | 6/1981 | Lippel . | |
| 4,639,911 | 1/1987 | Rota et al. | 348/484 |
| 4,825,286 | 4/1989 | Graves | 348/484 |
| 4,901,151 | 2/1990 | Mehrgardt et al. . | |
| 5,182,642 | 1/1993 | Gendorff et al. | 348/409 |

FOREIGN PATENT DOCUMENTS

| 0321681 | 6/1989 | European Pat. Off. . | |
| 0353883 | 2/1990 | European Pat. Off. . | |
| 2128454 | 4/1984 | United Kingdom | 358/86 |

OTHER PUBLICATIONS

A. J. R. M. Coenen, "Noise-Shaped PCM for video Processing and Transmission", *Electronics Letters*, 25 Apr. 1991, vol. 27, No. 9, pp. 712–713.

A. J. R. M. Coenen, "Maximum SQNR Formula for Delta-Sigma Modulation", *Electronics Letters*, 19 Jul. 1990, vol. 26, No. 15, pp. 1115–1116.

*Primary Examiner*—James J. Groody
*Assistant Examiner*—David E. Harvey
*Attorney, Agent, or Firm*—Peter L. Michaelson

[57] ABSTRACT

A composite signal which comprises a video signal situated in the base band and a frequency-modulated audio signal situated outside the base band is coded by an N-bit pulse code modulator or an N-bit noise-shaped pulse code modulator with inadequate quality for, for example, $N<5$ (in particular for $N=1$) because, after modulation, demodulation and decoding, the video signal is found to affect the audio signal if, as is usual, the amplitude of the video signal is, for example, ten times greater than the amplitude of the frequency-modulated audio signal. If the amplitude of the video signal is not more than five times greater (in the ideal case one and a half times greater) than the amplitude of the frequency-modulated audio signal, the effect mentioned is apparently considerably reduced.

11 Claims, 2 Drawing Sheets

METHOD AND APPARATUS FOR DIGITALLY CODING AND DECODING A COMPOSITE SIGNAL, CONTAINING BASEBAND AND OUT-OF-BAND SIGNALS USING RELATIVELY FEW BITS AND YIELDING A DECODED OUT-OF-BAND SIGNAL HAVING INCREASED QUALITY

BACKGROUND OF THE INVENTION

1. Field of the Invention

The invention relates to a method for digitally coding a composite signal which comprises a video signal and another signal.

2. Description of the Prior Art

A method for digitally coding a composite signal, formed of a video signal and another signal, is generally known. To digitally code or digitize an analog video signal, the video signal is converted into a digital signal by sampling the analog video signal and reproducing each sample obtained in this way using N bits (N-bit pulse code modulation, for example 8-bit PCM). If a composite signal which comprises a video signal situated in a base band and another signal situated outside the base band (such as, for example, a data signal) is to be digitize (the amplitude of the video signal is in this case generally ten to twenty times greater than the amplitude of the other signal), nothing in fact changes in the procedure mentioned and no additional problems arise. If, however, each sample of the analog composite signal is reproduced using fewer bits by reducing the number of bits in the case of N-bit PCM to a minimum of 1-bit PCM, in which case the spacings between the quantization levels increase after decoding, and by reducing the number of bits in the case of N-bit noise-shaped PCM to a minimum of 1-bit noise-shaped PCM such as delta-sigma modulation, in which case the spacings between the quantization levels, which are not equidistant under these circumstances, also increase after decoding, which increased spacings can be reduced by increasing the oversample factor, additional problems arise in all cases because, after decoding, the video signal situated in the base band is found to disadvantageously affect the other signal situated outside the base band.

SUMMARY OF THE INVENTION

The object of the invention is, inter alia, to provide a method of the type stated at the outset, in which, even if a sample of the analog composite signal is reproduced digitally with fewer bits (in the minimum case with one bit), the quality of the coding of the composite signal remains as good as possible.

For this purpose, the method according to the invention has the characteristic that an amplitude of the video signal is at most five times greater than an amplitude of the other signal.

Increasing the amplitude of the other signal to at least one fifth of the amplitude of the video signal achieves the result that, after decoding, the video signal situated in the base band affects the other signal situated outside the base band to a lesser extent.

The invention is based on the insight that, to the extent that a sample of the composite signal is coded digitally with fewer bits, the difference in amplitude between the video signal and the other signal should also decrease to at most a factor of five. As a result, the invention overcomes the prejudice that not less than 90% of the available modulation range should be used for the video signal during coding. This prejudice is based on the idea that the picture quality, which already decreases as a result of the use of fewer bits, should be reduced further as little as possible, which is achieved by reserving as large a portion as possible of the available modulation range for the video signal. As a result of the invention it becomes possible, for example, to use a delta-sigma modulator and demodulator on a commercial basis for coding and decoding video signals.

In a first embodiment, the method according to the invention has the characteristic that the other signal is a frequency-modulated signal.

If the other signal is a frequency-modulated signal, such as for example a frequency-modulated audio signal, troublesome noise signals are detectable (especially when audio is absent), which exhibit a relationship to the video signal, in the case of an amplitude ratio of the video signal and the frequency-modulated audio signal of, for example, a factor of ten. Reducing the amplitude ratio to at most a factor of five considerably reduces said troublesome noise signals.

In a second embodiment, the method according to the invention has the characteristic that the amplitude of the video signal is substantially one and a half times greater than an amplitude of the frequency-modulated signal.

If the amplitude of the video signal is substantially one and a half times greater than an amplitude of the frequency-modulated audio signal, the composite signal is coded with the best possible quality.

In a third embodiment, the method according to the invention has the characteristic that the other signal furthermore comprises a dither signal.

As a result of adding the dither signal (such as an oscillation signal) to the other signal, it is possible to make do with a smaller amplitude of the frequency-modulated signal, provided the amplitude of the other signal (that is to say the sum of the amplitudes of the frequency-modulated signal and the dither signal) is at least one fifth of the amplitude of the video signal. Both the frequency-modulated signal and the dither signal should be situated outside the base band of the video signal, and the dither signal should be outside the frequency band of the frequency-modulated signal.

In a fourth embodiment, the method according to the invention has the characteristic that the amplitude of the video signal is substantially one and a half times greater than the amplitude of the other signal, an amplitude of the frequency-modulated signal being substantially three times greater than an amplitude of the dither signal.

In this case, the composite signal, which comprises not only the video signal but also the frequency-modulated signal and the dither signal, is coded with the best possible quality.

The invention relates further to a system for using the method according to the invention, which system comprises a coder with a combining device for combining a video signal to be received and another signal to be received, and a digital coding device, coupled to the combining device, for digitally coding a composite signal, and comprising a decoder for decoding a coded composite signal.

The object of the invention is furthermore, inter alia, to provide a system of the abovementioned type which codes the composite signal with as good quality as possible, even if a sample of the composite signal is reproduced digitally with fewer bits.

For this purpose, the system according to the invention has the characteristic that the combining device comprises adjustment means for adjusting a mutual amplitude ratio of the video signal and of the other signal, the amplitude of the video signal being at most five times greater than an amplitude of the other signal.

Adjusting the amplitude of the other signal with the adjustment means to at least one fifth of the amplitude of the video signal achieves the result that, after decoding, the video signal affects the other signal less.

In a first embodiment, the system according to the invention has the characteristic that the other signal comprises a frequency-modulated signal.

If the other signal is a frequency-modulated signal, such as for example a frequency-modulated audio signal, troublesome noise signals are detectable (especially when audio is absent), which exhibit a relationship to the video signal, in the case of an amplitude ratio of the video signal and the frequency-modulated audio signal of, for example, a factor of ten. Reducing the amplitude ratio to at most a factor of five reduces said troublesome noise signals.

In a second embodiment, the system according to the invention has the characteristic that the amplitude of the video signal is substantially one and a half times greater than an amplitude of the frequency-modulated signal.

If the amplitude of the video signal is substantially one and a half times greater than an amplitude of the frequency-modulated audio signal, the composite signal is coded with the best possible quality.

In a third embodiment, the system according to the invention has the characteristic that the other signal furthermore comprises a dither signal, the adjustment means being designed to adjust mutual amplitude ratios of the video signal, the frequency-modulated signal and the dither signal.

As a result of adding the dither signal (such as an oscillation signal) to the other signal, it is possible to make do with a smaller amplitude of the frequency-modulated signal, provided the amplitude of the other signal (that is to say the sum of the amplitudes of the frequency-modulated signal and the dither signal) is at least one fifth of the amplitude of the video signal.

In a fourth embodiment, the system according to the invention has the characteristic that the amplitude of the video signal is substantially one and a half times greater than the amplitude of the other signal, an amplitude of the frequency-modulated signal being substantially three times greater than an amplitude of the dither signal.

In this case, the composite signal, which comprises not only the video signal but also the frequency-modulated signal and the dither signal, is coded with the best possible quality.

The invention also furthermore relates to a coder, a combining device, a coding device and a decoder for use in the system according to the invention.

References

ELECTRONICS LETTERS 19th Jul. 1990 Vol. 26 No. 15, pp. 1115–1116, "MAXIMUM SQNR FORMULA FOR DELTA-SIGMA MODULATION"
ELECTRONICS LETTERS 25th Apr. 1991 Vol. 27 No. 9, pp. 712–713, "NOISE SHAPED PCM FOR VIDEO PROCESSING AND TRANSMISSION"

Exemplary embodiments

The invention will be explained in greater detail by reference to exemplary embodiments shown in the figures, the same reference numerals in various figures indicating the same components. In the figures:

FIG. 1 shows a general diagram of a system according to the invention, comprising a coder having a digital coding device and a combining device and comprising a decoder, FIG. 2 shows a diagram of a system according to the invention, in which the digital coding device is an N-bit pulse code modulator, FIG. 3 shows a diagram of a system according to the invention, in which the digital coding device is a noise-shaped 1-bit pulse code modulator or a delta-sigma modulator, and FIG. 4 shows a possible design of a combining device and adjustment means, associated therewith, for use in a system according to the invention.

DETAILED DESCRIPTION

Figure 1:
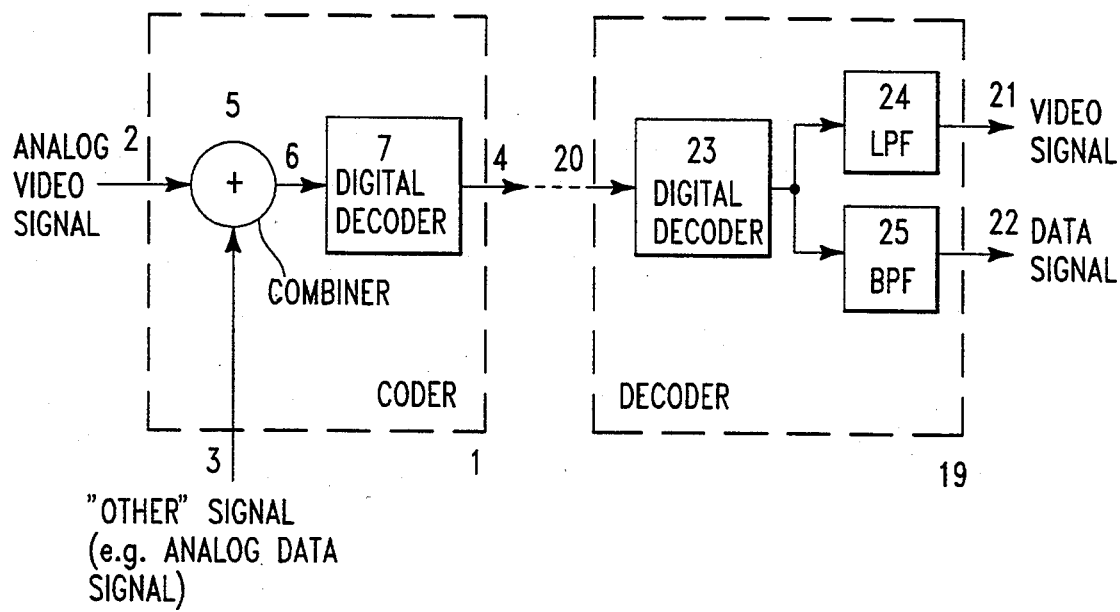

The system according to the invention shown in FIG. 1 comprises a coder 1 and a decoder 19 which can be coupled thereto (via a modulator and demodulator). The coder 1 contains an input 2 and an input 3 which are coupled to a combining device 5, an output 6 of which is coupled to an output 4 of the decoder 1 via a digital coding device 7. Combining device 5 is constructed using an analog adder which receives an analog video signal, situated in the base band, presented at input 2 via first amplifier/attenuator means (not specifically shown—though contained, e.g., within combining device 5) and which receives another signal, situated outside the base band, presented at input 3 via second amplifier/attenuator means, (also not specifically shown—though contained, e.g., within combining device 5) and which adds both signals in an analog manner, each with an amplification/attenuation which is such that the amplitude of the video signal is at most five times greater than the amplitude of the other signal (in the optimum case, approximately one and a half times). The other signal is, for example, an analog data signal which is to be transmitted together with the video signal. The two amplifier/attenuator means (shown in FIG. 4 and discussed in detail below) together form adjustment means for adjusting the mutual amplitude ratio of the video signal and the other signal.

The system shown in FIG. 1 further comprises the decoder 19 which was already mentioned earlier and which contains an input 20 which is coupled to a digital decoding device 23, of which an output is coupled to a low-pass filter (LPF) 24 for generating the video signal situated in the base band via an output 21 and to a band-pass filter (BPF) 25 for generating the data signal situated outside the base band via an output 22. In this connection, decoding device 23 may be provided with a digital/analog converter (DA converter), in which case low-pass filter 24 and band-pass filter 25 will be of the analog type. If decoding device 23 is not provided with a DA converter, low-pass filter 24 and band-pass filter 25 should be of the digital type.

As a result of using the first and second amplifier/attenuator means (the amplifier section thereof could be constructed in a manner known to the person skilled in the art using a fed-back OPerational AMPlifier, the value of a feedback resistor, for example, determining the gain factor, and the attenuator section could be constructed in a manner known to the person skilled in the art using a resistance divider), the amplitude of the video signal is at most five times greater than the amplitude of the other signal, which to a large extent reduces the effect of the video signal on the other signal, even if the number of bits with which the digital coding device reproduces a sample of the analog composite signal is reduced. This is in conflict with the hitherto existing prejudice that not less than 90% of the modulation range available for the composite signal should be used for the-video signal in the coding device. This prejudice is based on the idea that the picture quality, which already decreases as a result of the use of fewer bits, should be reduced further as little as possible, which is achieved by reserving as large as possible a section of the available modulation range for the video signal.

Figure 2:
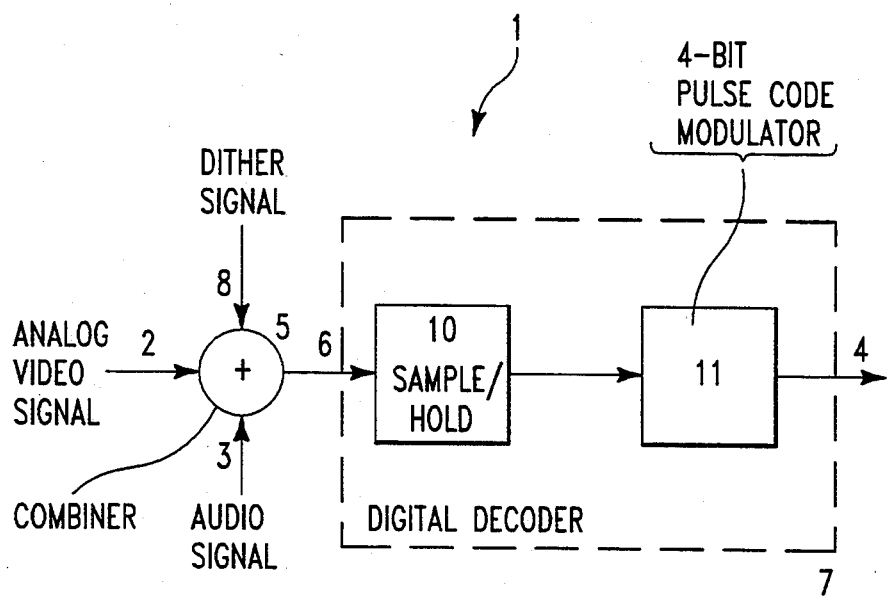
Figure 4:
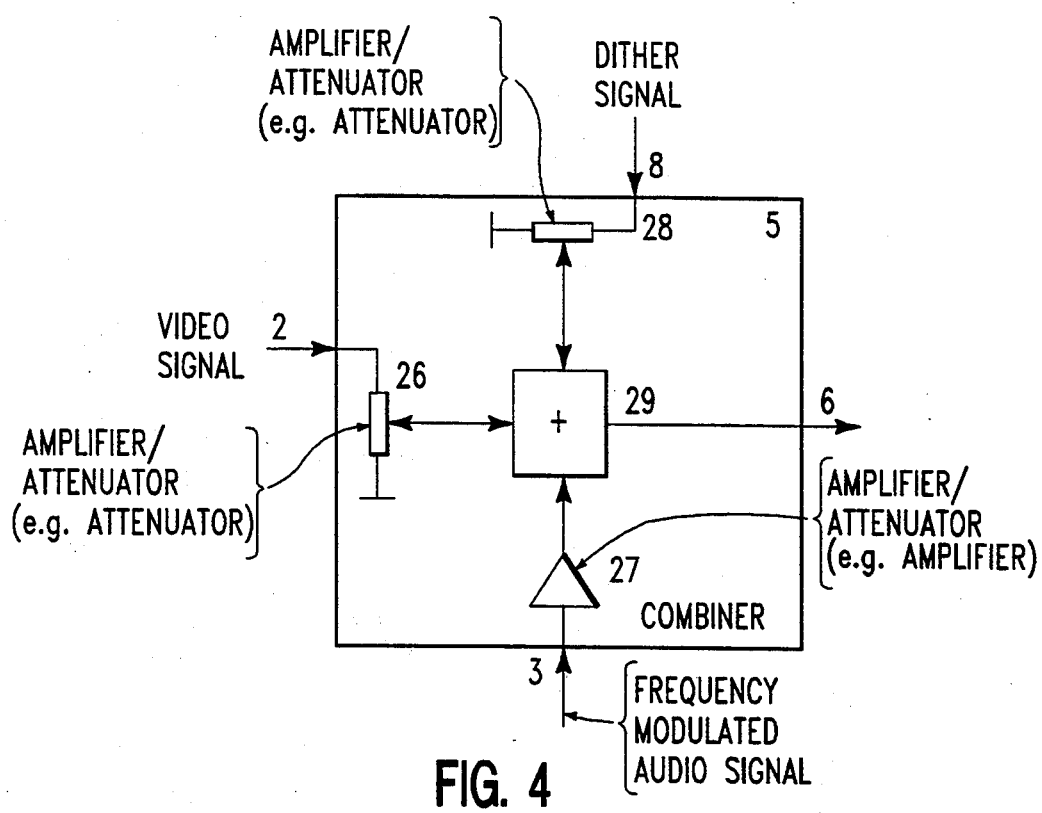

The system according to the invention shown in FIG. 2 comprises the coder 1, which contains the input 2, the input 3 and an output 8, which are coupled to the combining device 5, the input 6 of which is coupled to the output 4 of the coder 1 via the digital coding device 7. Combining device 5 is constructed using the analog adder which receives the analog video signal, situated in the base band, presented at input 2 via the first amplifier/attenuator means, (not specifically shown— though contained within combining device 5 shown in FIG. 4) which receives an audio signal, situated outside the base band, presented at input 3 via the second amplifier/attenuator means (also not specifically shown— though contained within combining device 5 shown in FIG. 4) and which receives a dither signal, situated outside the base band, presented at input 8 via third amplifier/attenuator means (not specifically shown— though, e.g., also contained within combining device 5 as shown in FIG. 4 and discussed below) and which adds the three signals in an analog manner, each with an amplification/attenuation which is such that the amplitude of the video signal is at most five times greater than the amplitude of the sum of the two other signals (in the optimum case approximately one and a half times, in which case the amplitude of the audio signal should then be approximately three times greater than the amplitude of the dither signal). The audio signal presented at input 3 and the dither signal presented at input 8 together form the other signal and may, of course, also be presented as a single, already added signal at input 3, in which case subsequent combining means are necessary to add these two signals and combining means 5 need to have only two inputs. Digital coding device 7 comprises, in FIG. 2, a series circuit of, for example, a sample-and-hold device 10 and a 4-bit pulse code modulator 11.

Figure 3:
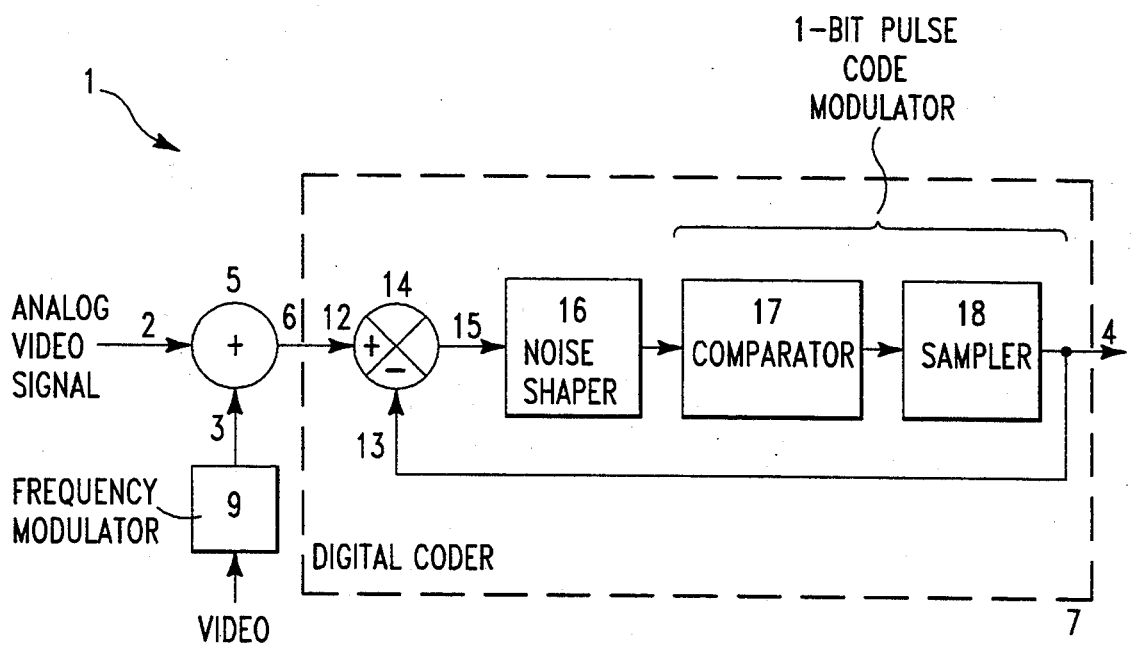

The system according to the invention shown in FIG. 3 comprises the coder 1, which has the input 2 and the input 3 which are coupled to the combining device 5, the output 6 of which is coupled to the output 4 of the coder 1 via the digital coding device 7. Combining device 5 is constructed using the analog adder which receives the analog video signal, situated in the base band, presented at input 2 via the first amplifier/attenuator means (again not specifically shown though contained within combining device 5) and which receives an audio signal, situated outside the base band and frequency-modulated via a frequency modulator 9, presented at input 3 via the second amplifier/attenuator means, (again not specifically shown though contained within combining device 5) and which adds the two signals in an analog manner, each with an amplification- /attenuation which is such that the amplitude of the video signal is at most five times greater than the amplitude of the frequency-modulated audio signal (in the optimum case, approximately one and a half times). Digital coding device 7 comprises, in FIG. 3, an adding- /subtracting device 14, an adding input 12 of which is coupled to the output 6 and an output 15 of which is coupled to a series circuit of, for example, a noise shaper 16, a 1-bit pulse code modulator 17, 18, constructed using a comparator 17 and a sampling device 18, an output of which is coupled to the output 4 and to a subtraction input 13 of adding/subtracting device 14. In this embodiment, digital coding device 7 forms an oversampled noise-shaped 1-bit pulse code modulator (oversampled if the sampling frequency is greater than twice the maximum frequency of the video signal situated in the base band) and if the noise shaper 16 is replaced by an integrator, the digital coding device 7 is termed a delta-sigma modulator.

As a result of using the first and second amplifier/attenuator means, it is possible to transmit a composite signal, which contains a video signal situated in base band and a frequency-modulated audio signal, via 1-bit coding, modulation, demodulation and decoding with good quality without the video signal affecting the frequency-modulated audio signal, not even at instants of silence when only the frequency carrier wave is present. A great advantage in this case is the sampling frequency, which is to be adjusted to a random value and which determines the oversample factor which governs the signal speed.

The possible design, shown in FIG. 4, of the combining device 5 and adjustment means associated therewith for use in a system according to the invention comprises the abovementioned analog adder 29 and the first amplifier/attenuator means 26 coupled to input 2, the second amplifier/attenuator means 27 coupled to input 3 and the third amplifier/attenuator means 28 coupled to input 8. The three amplifier/attenuator means 26, 27, 28 form in this case the adjustment means, which should be adjusted so as to comply with the abovementioned mutual amplitude ratios, and, at the same time, the modulation range available for the composite signal in the case of digital coding device 7 should be utilised as well as possible. In order to comply with these requirements, the analog video signal, situated in the base band, presented at input 2 must, for example, be made a factor of two smaller, the frequency-modulated audio signal, situated outside the base band, presented at input 3 must, for example, be amplified three times and, for example, the dither signal, situated outside the base band (and outside the frequency band of the frequency-modulated audio signal) presented at input 8 must be made a factor of five smaller. For this purpose, amplifier/attenuator means 26 comprise a potentiometer (an adjustable resistor), one end of which is coupled to input 2, the other end of which is coupled to earth and the center contact of which is coupled to a first input of analog adder 29. In order to attenuate the video signal by a factor of two, the center contact should be set midway between the two ends. Amplifier/attenuator means 27 comprise an amplifier, such as a fed-back OPAMP having a gain factor three, set by means of the feedback resistor, (not specifically shown but well known) one input of which is coupled to the input 3 and one output of which is coupled to a second input of analog adder 29. Amplifier/attenuator means 28 comprise a potentiometer (an adjustable resistor), one end of which is coupled to input 8, another end of which is coupled to earth and the center contact of which is coupled to a third input of analog adder 29. In order to attenuate the dither signal by a factor of five, the center contact should be set to four/fifths from the end coupled to input 8 and to one/fifth from the other end, coupled to earth. An output of analog adder 29 is coupled to output 6 of combining device 5.

It should be pointed out that, in accordance with the CCIR standard, known to the person skilled in the art, a video signal is made up of front and back porches and sync pulses, which together have an amplitude of approximately 30% of the amplitude of the total video signal, and of a luminance/chrominance signal, which has an amplitude of approximately 70% of the amplitude of the total video signal. All the abovementioned amplitude ratios and amplitude ratios still to come up for consideration relate to the ratio of the amplitude of the total video signal with respect to the amplitude of the other signal, regardless of whether the video signal is constructed in accordance with the CCIR standard or not (the latter occurs, for example, if the amplitude of the porches and sync pulses is reduced or if they are even completely removed from the video signal, which then still comprises the luminance/chrominance signal alone).

I claim:

1. A method for producing a coded signal for communicating both a first analog signal and a second analog signal, the first signal being an analog video signal situated in a baseband and said second signal being an analog signal different from said first signal and situated outside said baseband, wherein the method comprises the steps of:

forming a composite signal comprising the first signal and the second signal, wherein the forming step comprises the step of adjusting an amplitude of at least one of the first and said second signals such that, in the composite signal, an amplitude of the video signal is not more than five times greater than an amplitude of the second signal; and digitally coding the composite signal to yield the coded signal.

2. The method according to claim 1 wherein the second signal comprises a frequency-modulated signal.

3. The method according to claim 2 wherein, in the composite signal, the amplitude of the video signal is substantially one and a half times greater than an amplitude of the frequency-modulated signal.

4. The method according to claim 2 wherein the second signal also comprises a dither signal, said dither signal being in addition to said frequency-modulated signal.

5. The method according to claim 4 wherein, in the composite signal, the amplitude of the video signal is substantially one and a half times greater than an amplitude of the second signal and, further in the composite signal, an amplitude of the frequency-modulated signal is substantially three times greater than an amplitude of the dither signal.

6. A communication system comprising:
a coder having:
a combining device for combining a first signal and a second signal to yield a composite signal, said first signal being an analog video signal situated in a baseband and said second signal being an analog signal different from the video signal and situated outside the baseband, wherein said combining means comprises adjustment means for adjusting a mutual amplitude ratio of the first and second signals such that, in said composite signal, an amplitude of the video signal is not more than five times greater than an amplitude of the second signal; and
a digital coding device, coupled to the combining device, for digitally coding the composite signal so as to yield a coded composite signal; and
a decoder for decoding the coded composite signal.

7. The system according to claim 6 wherein the second signal comprises a frequency-modulated signal.

8. The system according to claim 7 wherein, in the composite signal, the amplitude of the video signal is substantially one and a half times greater than an amplitude of the frequency-modulated signal.

9. The system according to claim 7 wherein the second signal also comprises a dither signal, said dither signal being in addition to said frequency-modulated signal; and said adjustment means further comprises means for adjusting mutual amplitude ratios of the video signal, the frequency-modulated signal and the dither signal.

10. The system according to claim 9 wherein, in the composite signal, the amplitude of the video signal is substantially one and a half times greater than an amplitude of the second signal and, further in the composite signal, an amplitude of the frequency-modulated signal is substantially three times greater than an amplitude of the dither signal.

11. A coder comprising:
a combining device for combining a first signal and a second signal to yield a composite signal, said first signal being an analog video signal situated in a baseband and said second signal being an analog signal different from the first signal and situated outside the baseband, wherein said combining means comprises adjustment means for adjusting a mutual amplitude ratio of the first and second signals such that, in said composite signal, an amplitude of the video signal is not more than five times greater than an amplitude of the second signal; and
a digital coding device, coupled to the combining device, for digitally coding the composite signal to yield a coded signal.

* * * * *

UNITED STATES PATENT AND TRADEMARK OFFICE
CERTIFICATE OF CORRECTION

PATENT NO.   : 5,416,525
DATED        : May 16, 1995
INVENTOR(S)  : Antonius J.R.M. Coenen It is certified that error appears in the above-indentified patent and that said Letters Patent is hereby corrected as shown below:

On the title page item [75],

Delete "Antonius J. R. Maria" and replace with
--Antonius J.R.M. Coenen--; and

Signed and Sealed this

Third Day of October, 1995

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,416,525
DATED : May 16, 1995
INVENTOR(S) : Antonius J.R.M. Coenen It is certified that error appears in the above-indentified patent and that said Letters Patent is hereby corrected as shown below:

Title page, Item [75] Inventor:
Delete "Antonius J. R. Maria" and replace with
--Antonius J.R.M. Coenen--; and
On the title page,
Item [73] Assignee:
After "Netherlands", insert --Technische Universiteit, the Netherlands--.

Signed and Sealed this

Thirty-first Day of October 1995

Attest:

BRUCE LEHMAN

*Attesting Officer*      *Commissioner of Patents and Trademarks*